LOW FREQUENCY PHASE-SENSITIVE DETECTION SYSTEM

Filed Dec. 1, 1958 3 Sheets-Sheet 1

INVENTOR
PHILIP M. THOMPSON
BY- Smart & Biggar.
ATTORNEYS.

April 5, 1960 P. M. THOMPSON 2,931,984

LOW FREQUENCY PHASE-SENSITIVE DETECTION SYSTEM

Filed Dec. 1, 1958 3 Sheets-Sheet 2

INVENTOR
PHILIP M. THOMPSON
BY- Smart & Biggar.
ATTORNEYS.

LOW FREQUENCY PHASE-SENSITIVE DETECTION SYSTEM

Filed Dec. 1, 1958 3 Sheets-Sheet 3

INVENTOR
PHILIP M. THOMPSON
BY- Smart & Biggar.
ATTORNEYS

United States Patent Office 2,931,984
Patented Apr. 5, 1960

2,931,984

LOW FREQUENCY PHASE-SENSITIVE DETECTION SYSTEM

Philip Martin Thompson, Cumberland, Ontario, Canada, assignor to Her Majesty the Queen in right of Canada as represented by the Minister of National Defence Application December 1, 1958, Serial No. 777,302

1 Claim. (Cl. 328—134)

The invention relates to a phase-sensitive detector of the type using a ring of diode rectifier elements connected in a circuit usually referred to as a ring modulator or detector.

A ring modulator or detector has four diode elements connected in series to form a ring. The diodes are connected with a polarity which will readily permit a current to flow around the ring in one direction. Appropriate input and output connections are made to the nodal points of the ring. A diode ring can be used as a phase-sensitive detector in which the modulated signal of unknown or variable phase is applied to one pair of alternating current connections of the ring and a reference signal of predetermined frequency and phase is applied to the other pair of alternating current connections. The resultant output signal from the direct current terminals will depend on the amplitude of the input signal and the phase of input signal as compared to the reference signal. Such a detector requires current transformers in its alternating current connections and at very low frequencies, for example in the range from 100 cycles per second down to $1/100$ cycle per second, these transformers are costly, difficult to design, large in size and too heavy for many applications.

A phase-sensitive detector according to the present invention avoids this disadvantage by using three diode rings, two of which modulate the input signal and a reference signal on to a higher frequency carrier signal while the third removes the carrier signal and provides an output signal wave dependent on phase and amplitude differences between the input signal and reference signal.

According to the present invention a phase-sensitive detector for a low frequency input signal comprises a source of a low frequency square wave reference signal and a source of carrier wave of a frequency substantially higher than the frequency of the input signal and of the reference frequency so that the carrier frequency wave is adapted to act as a carrier for the low frequency signals. Three diode rings each adapted for operation by alternating current signals of the carrier frequency are connected to current transformers which transfer signal current at the carrier frequency between one of the diode rings and each of the other two diode rings. Current transformers are provided to transfer modulated signal current at the carrier frequency between the source of the carrier frequency signal and input connections of the two diode rings. One of the three diode rings has input connections for the low frequency input signal, another has input connections to the source of the low frequency reference signal, and the remaining one has the output connections of the detector.

The design of current transformers for a circuit, according to the invention, is greatly simplified because the low frequency signal information is present in the transformers only in the form of modulation on a high frequency carrier signal of which the frequency may be selected by the designer. A circuit, according to the invention, is useful over a wide range of low frequencies; for example, from 100 cycles down to $1/100$ cycle per second. The carrier frequency may be a frequency in the order of 5 kilocycles per second at which the design of current transformers is simplified, and the transformers are small, light and inexpensive. It is an important advantage of the invention that even though the detector is to be used for a wide range of low frequency input signals, the transformers need be designed for one frequency only, i.e. for the high frequency carrier signal.

The invention will be further described with reference to the accompanying drawings, in which.

Figure 1:
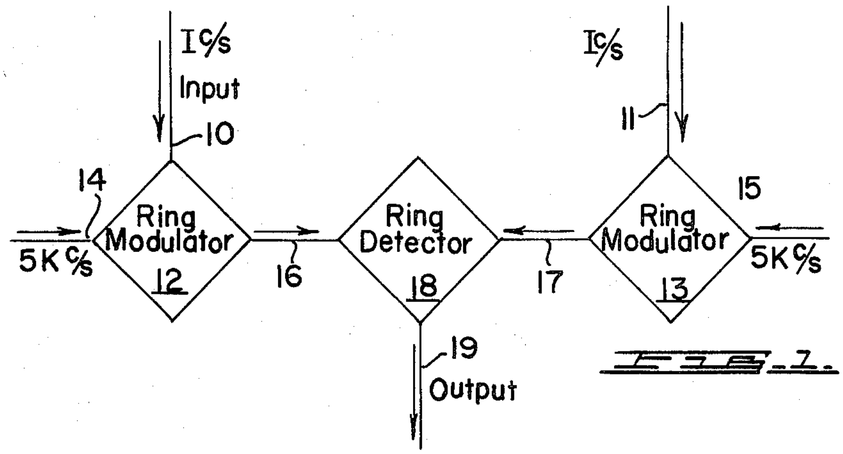
Figure 1 is a block diagram illustrating an embodiment of the invention.

The circuit illustrated by the block diagram of Figure 1 is useful to obtain information about a very low frequency input signal; for example, an input signal of one cycle per second as shown in Figure 1 connected to the input connection 10. However, the system is useful for a wide range of low frequency signals such as from 100 cycles per second down to $1/100$ of a cycle per second so that it is useful in the analysis of servo systems where it is necessary to be able to measure the phase of a very low frequency signal.

A square wave reference signal of the same frequency as the input signal is supplied on the connection 11. The input signal and the square wave reference signal are supplied to the ring modulators 12 and 13, each of which also has an input carrier signal of 5 kilocycles per second supplied by input connections 14 and 15. The output connection 16 of the ring modulator 12 and the output connection 17 of the ring modulator 13 are also the input connections to a ring detector 18. The ring detector 18 supplies a demodulated signal to its output connection 19.

Figure 2:
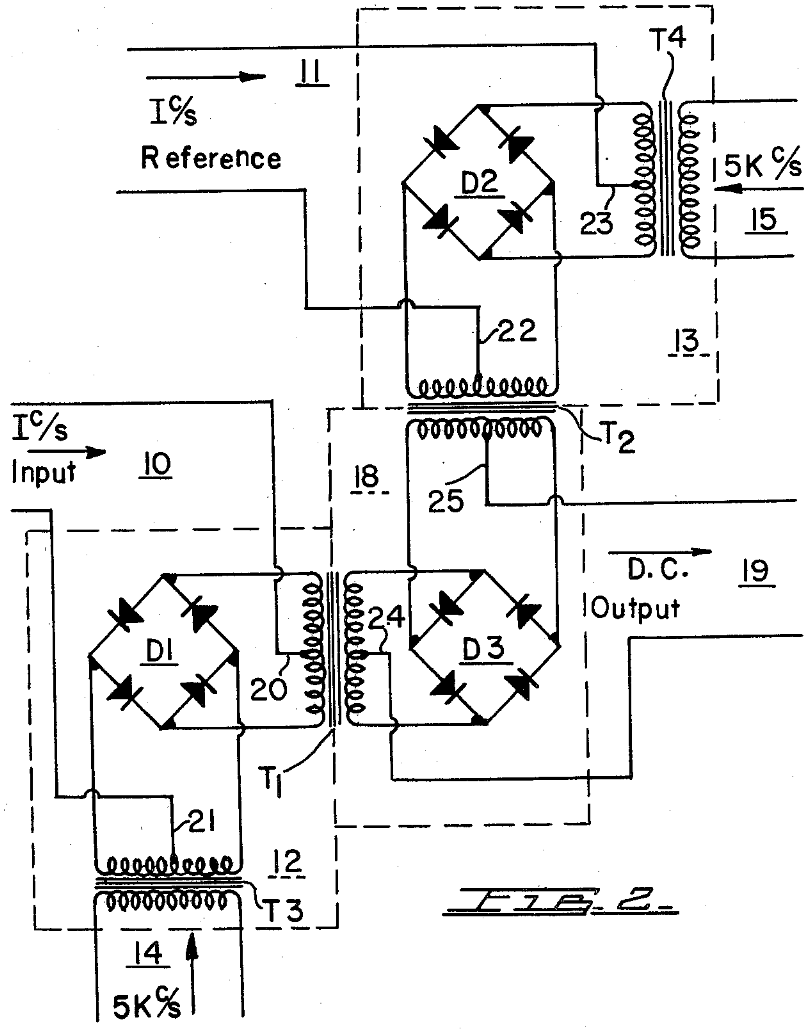
Figure 2 is a schematic circuit diagram of the embodiment shown in Figure 1.

Figure 2 is a schematic diagram of the circuit illustrated in block form in Figure 1 and the reference designations used in Figure 1 have been appiled to Figure 2. The ring modulators 12 and 13 and the ring detector 18 are indicated by dashed line blocks in Figure 2. The ring modulators 12 and 13 include diode rings D1 and D2 while the ring detector 18 includes a diode ring D3. The diode rings D1, D2 and D3 are interconnected between pairs of nodal points by transformers T1 and T2. Transformers T3 and T4 supply the 5 kilocycle per second carrier signal to the diode rings D1 and D2. The 1 cycle per second input signal is supplied by the connections 10 between the centre taps 20 and 21 of the transformers T1 and T3. The 1 cycle per second square wave reference signal is supplied by the connections 11 between the centre taps 22 and 23 of the transformers T2 and T4. The output signal is available from the centre taps 24 and 25 of the transformers T1 and T2. The individual circuits of the ring modulators 12 and 13 and of the ring detector 18 are well known and therefore only the overall operation of the complete circuit will be dealt with below.

Figure 3:
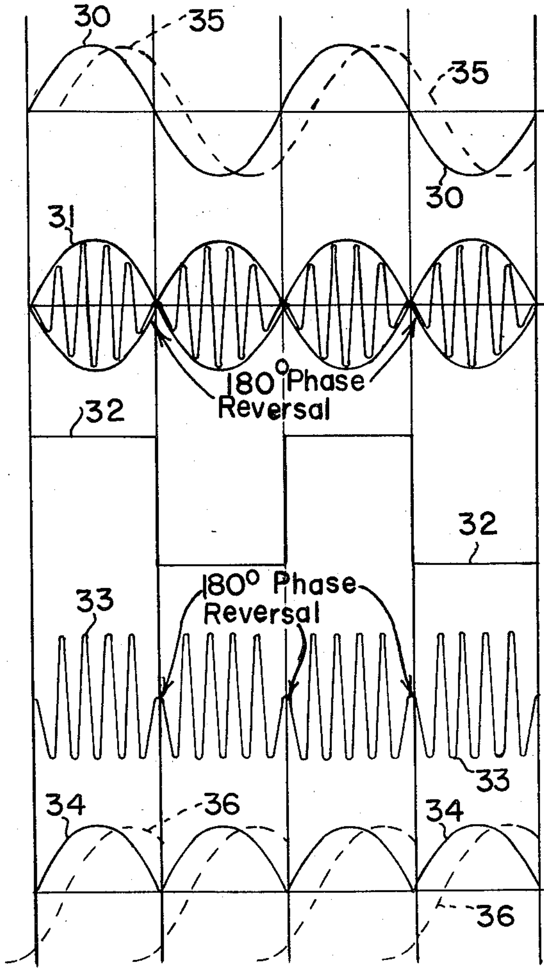
Figure 3 is a graph showing wave forms present in various parts in the circuit shown in Figures 1 and 2, and Figures 4 and 5 show other embodiments of the invention in block form.

The operation of the circuit shown in Figures 1 and 2 is illustrated by the wave forms shown in Figure 3. The input wave form is shown by the curve 30 and this is the signal available on the input connection 10 of Figures 1 and 2. The 5 kilocycle carrier signal supplied on the connection 14 to the ring modulator 12 is modulated by the input signal 30 (Figure 3) in the ring modulator 12 and appears on the connection 16 as a modulated carrier, shown by the wave form 31 in Figure 3. At the same time, in the ring-modulator 13 the carrier signal supplied on the connection 15 is supplied to the connection 17 with phase reversals caused by the square wave reference signal (wave form 32 of Figure 3) supplied on the connection 11; this square wave modulator carrier is shown in Figure 3 by the wave form 33. Corresponding phase reversals occur in the carrier signal in the ring modulator 12 and are shown in the wave form 31. The ring detector 18 has input signals from the connections 16 and 17 of wave forms 31 and 33 with the result that the carrier frequency signal is removed and an output signal is obtained on the connection 19 of the wave form shown in Figure 3 as wave form 34. The output wave form 34 is indicative of the amplitude and phase of the input signal supplied to the connection 10 in Figures 1 and 2 and may be expressed by $a \cos \theta$; where $a$ is the amplitude of the input signal 30 (Figure 3) and $\theta$ is its phase angle in relation to the reference signal.

Figure 3 also illustrates by the dashed line input wave form 35 the case of the input signal being a small angle out of phase with respect to the reference signal. The dashed line output wave form 36 shows the corresponding output signal. For this case the other wave forms shown in Figure 3 would be moved correspondingly to the right and are not shown to avoid crowding of the wave forms in the figure.

Figure 4:
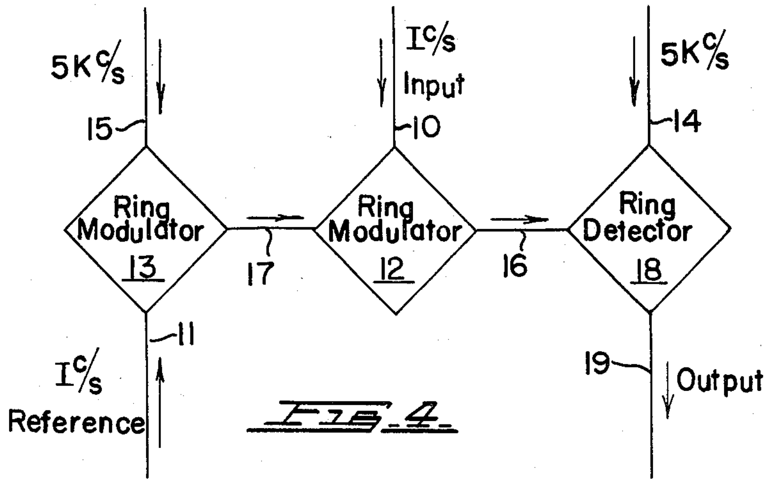
Figure 5:
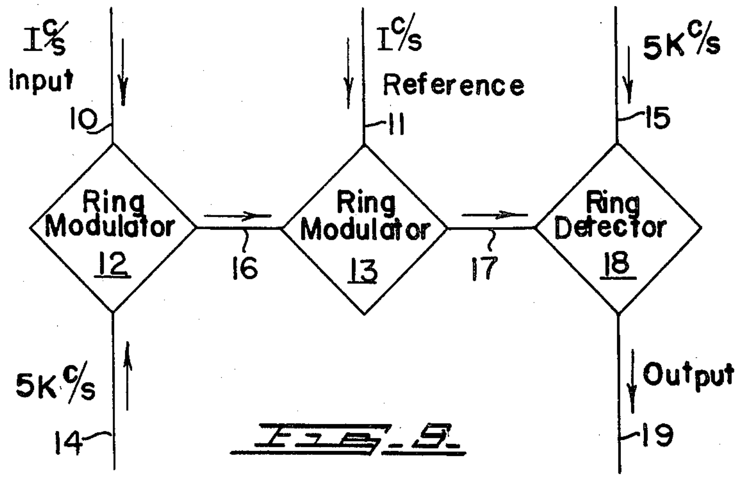

Figures 4 and 5 show other arrangements of the circuits shown in Figures 1 and 2. The same reference numbers are used in Figures 4 and 5 as in Figure 1. The design and operation of the particular circuits for Figures 4 and 5 are similar to those for Figure 1 and the input and output wave forms are the same as those shown in Figure 3.

Each of the ring-modulators and ring-detectors shown in Figures 4 and 5 has the same components and circuits as shown in Figure 2. Figures 4 and 5 are for the purpose of showing two alternative interconnections of the three diode rings shown in Figure 1. In these arrangements, the ring-modulators 12 and 13 are connected in tandem in the circuit which supplies the carrier wave to one input circuit of the detector ring, whereby both modulations are carried by this carrier wave, while the other input circuit of the ring-detector is energized by an un-modulated carrier wave.

What I claim as my invention is:

A phase-sensitive detector for a low frequency input signal comprising a source of a low frequency square wave reference signal, a source of carrier frequency signal of a frequency substantially higher than the frequency of said input signal and of said reference frequency so that said carrier frequency signal is adapted to act as a carrier for the low frequency signals, three diode rings each adapted for operation by alternating current signals of said carrier frequency, current transformers adapted to transfer signal current at said carrier frequency between one of the diode rings and each of the other two diode rings, current transformers adapted to transfer signal current at said carrier frequency between said source of the carrier frequency signal and input connections of said two diode rings, one of said three diode rings having input connections for the low frequency input signal, another of said three diode rings having input connections to the source of the low frequency reference signal, and the remaining one of said three diode rings having the output connections of said detector.

No references cited.